(12) United States Patent  (10) Patent No.: US 9,990,379 B2
Zhu et al.  (45) Date of Patent: Jun. 5, 2018

(54) METHOD AND APPARATUS FOR PROCESSING TIMEDLY-PUBLISHED DATA

(71) Applicant: TENCENT TECHNOLOGY (SHENZHEN) COMPANY LIMITED, Shenzhen (CN)

(72) Inventors: Xiongfeng Zhu, Shenzhen (CN); Xiaopeng Cai, Shenzhen (CN); Yang Liu, Shenzhen (CN); Wu Hu, Shenzhen (CN); Jiewen Lin, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 590 days.

(21) Appl. No.: 14/605,319

(22) Filed: Jan. 26, 2015

(65) Prior Publication Data

US 2015/0134605 A1  May 14, 2015

Related U.S. Application Data

(60) Provisional application No. PCT/CN2014/083700, filed on Aug. 5, 2014.

(30) Foreign Application Priority Data

Aug. 21, 2013 (CN) .......................... 2013 1 0367744

(51) Int. Cl.
*G06F 17/30* (2006.01)
(52) U.S. Cl.
CPC .. *G06F 17/30289* (2013.01); *G06F 17/30091* (2013.01); *G06F 17/30117* (2013.01); *G06F 17/30345* (2013.01)

(58) Field of Classification Search
CPC ......... G06F 17/30339; G06F 17/30289; G06F 17/30345
See application file for complete search history.

(56) References Cited

U.S. PATENT DOCUMENTS 6,101,585 A * 8/2000 Brown ................ G06F 11/1451
707/999.202
2004/0139091 A1 * 7/2004 Shin .................. G06F 17/30911
(Continued)

FOREIGN PATENT DOCUMENTS

CN  1794708 A  6/2006
CN  101193348 A  6/2008
(Continued)

OTHER PUBLICATIONS

The World Intellectual Property Organization (WIPO) International Search Report for PCT/CN2014/083700 dated Nov. 18, 2014.

*Primary Examiner* — Amanda L Willis
*Assistant Examiner* — Vaishali Shah
(74) *Attorney, Agent, or Firm* — Anova Law Group, PLLC

(57) ABSTRACT

Methods and apparatus for processing timedly-published data are provided. After receiving an operation request for the timedly-published data, at least one of an append-file and a delete-file can be written according to the operation request. The append-file corresponds to to-be-appended timedly-published data or post-updated timedly-published data. The delete-file corresponds to to-be-deleted timedly-published data or pre-updated timedly-published data. Each of the append-file and the delete-file uses a publishing time of the timedly-published data as an index.

10 Claims, 5 Drawing Sheets

(56) References Cited

U.S. PATENT DOCUMENTS

2006/0230170 A1* 10/2006 Chintala ............ H04N 7/17336
709/231
2008/0120409 A1* 5/2008 Sun ...................... H04L 67/325
709/224
2015/0058293 A1* 2/2015 Kobayashi ............ G06F 3/0607
707/634

FOREIGN PATENT DOCUMENTS

| | | |
|---|---|---|
| JP | 2005050242 A | 2/2005 |
| WO | 2005074596 A2 | 8/2005 |

* cited by examiner

METHOD AND APPARATUS FOR PROCESSING TIMEDLY-PUBLISHED DATA

CROSS-REFERENCES TO RELATED APPLICATIONS

This application is a continuation application of PCT Patent Application No. PCT/CN2014/083700, filed on Aug. 5, 2014, which claims priority to Chinese Patent Application No. 2013103677442, filed on Aug. 21, 2013, the entire content of both of which is incorporated herein by reference.

FIELD OF THE DISCLOSURE

The present disclosure generally relates to the field of the computer technology and, more particularly, relates to methods and apparatus for processing timedly-published data.

BACKGROUND

With the development of computer and network technology, more applications rely on a server to release information at predetermined times. For example, in a "farm" game, a game notification may be sent to the user at a predetermined publishing time. In another example, a birthday notification may be sent to friends at a predetermined time. In a further example, an information message may be sent to users in the whole network at predetermined times. To timedly publish information, saving and pulling of the timedly-published data are required.

Conventionally, the timedly-published data can be stored using a relationship database or a key-value storage system. However, the amount of concurrent requests from users can be large. According to such requests from the users, the server needs to inquire the database, and to append, delete, or update the timedly-published data. In addition, after the server finishes the updating, the server subsequently needs to read corresponding timedly-published data at predetermined publishing times, and then publish. As such, the handling amount of the timedly-published data is very large and time-consuming. Handling efficiency can be reduced. In some cases, the publishing can be delayed and some of the timedly-published data can be lost.

Because the processing timedly-published data is an important aspect of computer technology dealing with online data applications, technical solutions are needed to solve and/or improve the issues associated with the conventional timedly-published data processing methods and systems. Thus, there is a need to overcome these and other problems of the prior art and to provide methods and apparatus for processing timedly-published data.

BRIEF SUMMARY OF THE DISCLOSURE

One aspect or embodiment of the present disclosure includes a method for processing timedly-published data. After receiving an operation request for the timedly-published data, at least one of an append-file and a delete-file is written according to the operation request. The append-file corresponds to to-be-appended timedly-published data or post-updated timedly-published data. The delete-file corresponds to to-be-deleted timedly-published data or pre-updated timedly-published data. Each of the append-file and the delete-file uses a publishing time of the timedly-published data as an index.

One aspect or embodiment of the present disclosure includes an apparatus for processing timedly-published data. The apparatus can include a receiving module and a processing module. The receiving module is configured to receive an operation request for the timedly-published data. The processing module is configured to write at least one of an append-file and a delete-file according to the operation request. The append-file corresponds to to-be-appended timedly-published data or post-updated timedly-published data, and the delete-file corresponds to to-be-deleted timedly-published data or pre-updated timedly-published data. Each of the append-file and the delete-file uses a publishing time of the timedly-published data as an index.

One aspect or embodiment of the present disclosure includes a non-transitory computer-readable medium having computer program. When being executed by a processor, the computer program performs a method for processing timedly-published data. The method includes receiving an operation request for the timedly-published data and writing at least one of an append-file and a delete-file according to the operation request. The append-file corresponds to to-be-appended timedly-published data or post-updated timedly-published data, and the delete-file corresponds to to-be-deleted timedly-published data or pre-updated timedly-published data, and each of the append-file and the delete-file uses a publishing time of the timedly-published data as an index.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

FIGS. 1-8 depict exemplary methods and apparatus for processing timedly-published data consistent with various disclosed embodiments. As used herein, the term "timedly-published data" refers to data published at predetermined times. The exemplary methods and apparatus can be implemented, for example, in an exemplary environment 900 as shown in FIG. 9.

Figure 9:
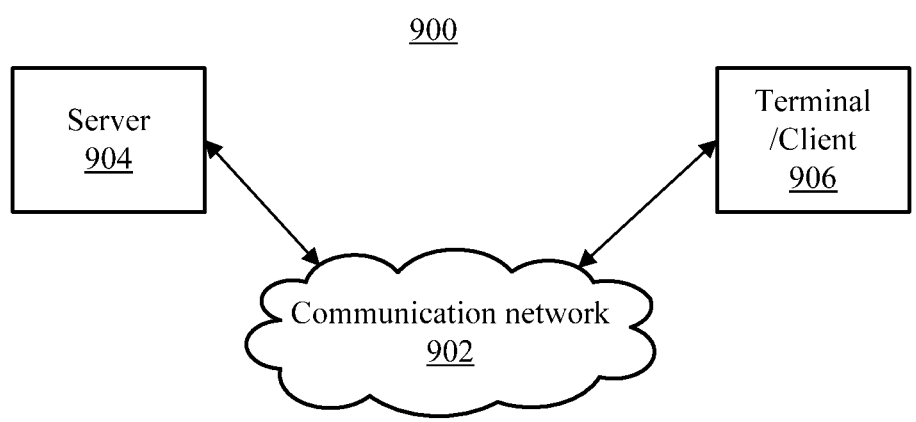
FIG. 9 depicts an exemplary environment incorporating certain disclosed embodiments.

FIG. 9 depicts an exemplary environment 900 incorporating certain disclosed embodiments. As shown in FIG. 9, environment 900 can include a server 904, a client 906 (and/or a terminal), and a communication network 902. The server 904 and the client 906 may be coupled through the communication network 902 for information exchange, such as webpage browsing, Internet searching, data downloading, etc. Although only one client 906 and one server 904 is shown in the environment 900, any number of clients 906 or servers 904 may be included, and other devices may also be included.

Communication network 902 may include any appropriate type of communication network for providing network connections to the server 904 and client 906 or among multiple servers 904 or clients 906. For example, communication network 902 may include the Internet or other types of computer networks or telecommunication networks, either wired or wireless.

A client, as used herein, may refer to any appropriate user terminal with certain computing capabilities, such as a personal computer (PC), a work station computer, a server computer, a hand-held computing device (tablet), a smart phone or mobile phone, or any other user-side computing device.

Figure 8:
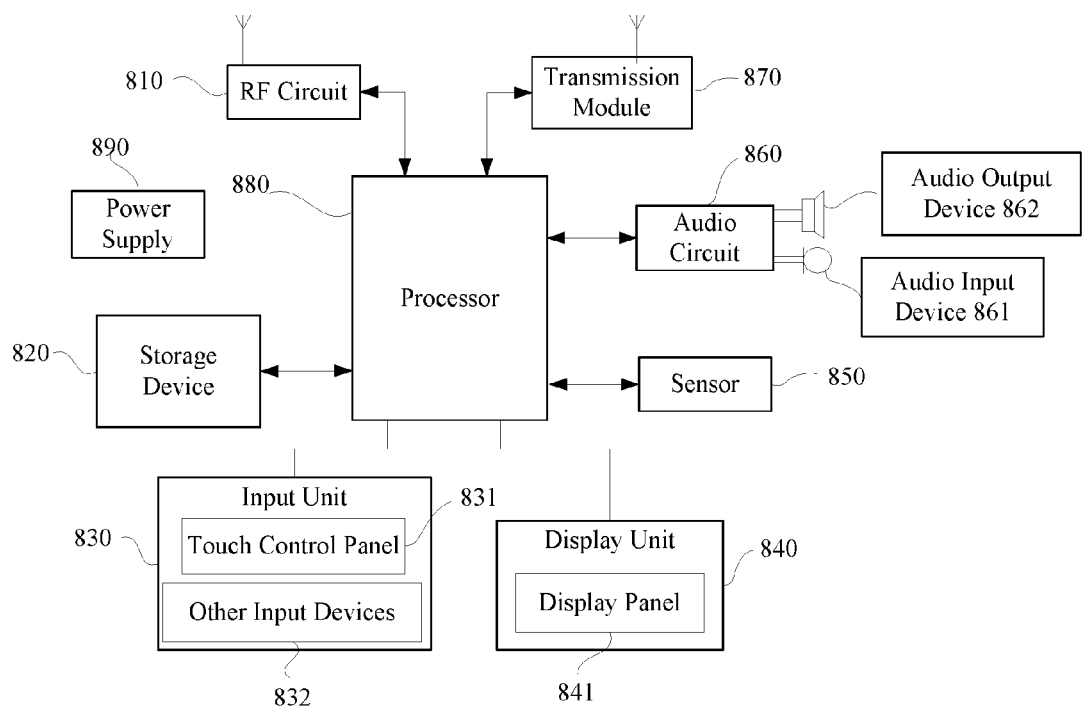
FIG. 8 depicts an exemplary publishing terminal for processing timedly-published data consistent with various embodiments.

A server, as used herein, may refer one or more server computers configured to provide certain server functionalities, such as database management and search engines. A server may also include one or more processors to execute computer programs in parallel. The server 904 and the client/terminal 906 may be implemented on any appropriate computing platform, e.g., as shown in FIG. 8.

Figure 1:
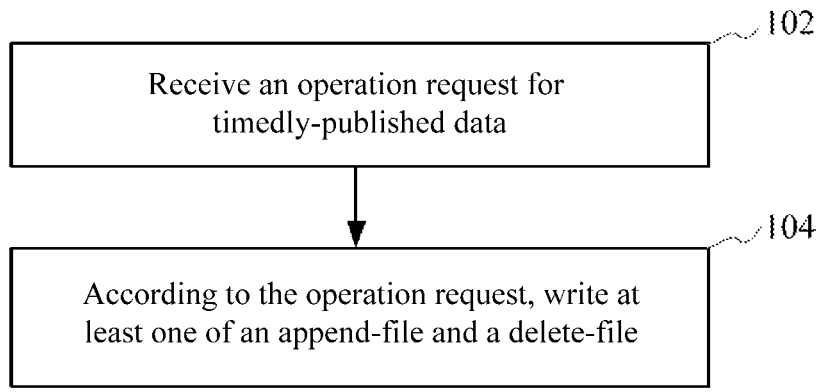
FIG. 1 depicts an exemplary method for processing timedly-published data consistent with various embodiments.

FIG. 1 depicts an exemplary method for processing timedly-published data consistent with various embodiments. The disclosed method can be used in application scenarios of altering timedly-published information. For example, the user can use a client to send newly-appended timedly-published data, delete current timedly-published data, and/or update current timedly-published data. The timedly-published data can be used to provide network users with: a game notification, a friend's birthday notification, an information message publication, etc.

In Step 102, an operation request for timedly-published data can be received.

In one embodiment, the operation request can be sent from a client by the large number of users and can then be received. The received operation request can contain a data append request, a data delete request, and a data update request. The timedly-published data can use "minute" or "hour" or "week" as a unit. The data append request can be configured to append a piece of timedly-published data that users want to timedly publish. For example, a piece of timedly-published data to be timedly-published at a time of 18:20 on May 31, 2013 can be appended. The piece of timedly-published data can have a publishing content, e.g., "Tomorrow is a Children's Day". The data delete request can be configured to delete a piece of timedly-published data. For example, a farm game notification published at a time of 23:12 on Aug. 22, 2013 can be deleted. The data update request can be configured to update a piece of timedly-published data. For example, the publishing time and/or the publishing content can be updated.

In Step 104, according to the operation request, at least one of an append-file and a delete-file can be written.

According to the received operation request, an operation of writing at least one of an append-file and a delete-file can be processed. The append-file and the delete-file can use the publishing time of the timedly-published data as an index. The append-file can correspond to the to-be-appended timedly-published data or the post-updated timedly-published data. The delete-file can correspond to the to-be-deleted timedly-published data or the pre-updated timedly-published data. The append-file and the delete-file can be distinguished by different suffixes. For example, the append-file can use ".data" as the file suffix, while the delete-file can use ".del" as the file suffix. When the received operation requests have different types, files to be written are also different.

When the received operation request is a data append request, only an append-file needs to be written. For example, when a notification to be published at a time of around 18:12 on Jun. 21, 2013 needs to be newly appended, an append-file with an index catalog of "20130621/1812.data" can be created, and the appended timedly-published data can be recorded into the append-file.

When the received operation request is a data delete request, only a delete-file needs to be written. For example, when a notification published at a time of around 23:12 on Jun. 21, 2013 needs to be deleted, a delete-file with an index catalog of "20130622/2312.del" can be created, and the to-be-deleted timedly-published data or the unique ID corresponding to said timedly-published data can be recorded into the delete-file.

When the received operation request is a data update request, an append-file and a delete-file need to be written to record information of the pre-updated timedly-published data, such as a unique ID, into the delete-file, and to write the post-updated timedly-published data into the append-file. For example, when a user requests to update the timedly-published data with the publishing time of around 22:10 on Jun. 23, 2013, e.g., only to update the content from "Tomorrow is Children's day" to "Tomorrow is Teacher's day", a corresponding file-writing operation can be: recording the unique ID of the pre-updated timedly-published data in the delete-file with an index catalog of "20130623/2210.del", and recording the post-updated timedly-published data (e.g., including the post-updated unique ID, the published content, etc.) in the append-file with an index catalog of "20130623/2210.data".

In one embodiment, the index catalog for the append-file and the delete-file can only contain a publishing time of the timedly-published data. In other embodiments, the index key of the append-file and the delete-file can contain the publishing time of the timedly-published data and also contain corresponding information of a user number. For example, when a user client having a user number "10002" sends a data append request to request to append a piece of timedly-published data with the publishing time of around 18:21 on Jun. 22, 2013, the append-file with the index catalog of "10002/20130622/1821.data" can be correspondingly written. When an amount of user number is relatively high, to reduce the amount of writing files and to improve the performance, a remainder result of a modulo (mod) operation on the user number by a greater natural number (e.g., greater than the user number) can be used as a top-layer catalog in the index catalog, and the higher natural number can be, e.g., 1000. For example, when the user client having the user number of "1000532" sends a data delete request to delete timedly-published data with a publishing time of around 22:15 on Jun. 23, 2013, correspondingly, a delete-file having an index catalog of "532/20130623/2215.del" needs to be written.

In the disclosed methods and apparatus for processing timedly-published data, after receiving a large number of operation requests from users, using a publishing time of the timedly-published data to be appended, deleted, or updated as an index, writing operations of the append-file or the delete-file can be directly processed. As compared with conventional technologies, there is no need to perform cumbersome operations of inquiring a database and then modifying the database. The disclosed methods and apparatus can thus reduce time for appending, deleting, and/or updating the timedly-published data, and can improve the processing efficiency.

Figure 2:
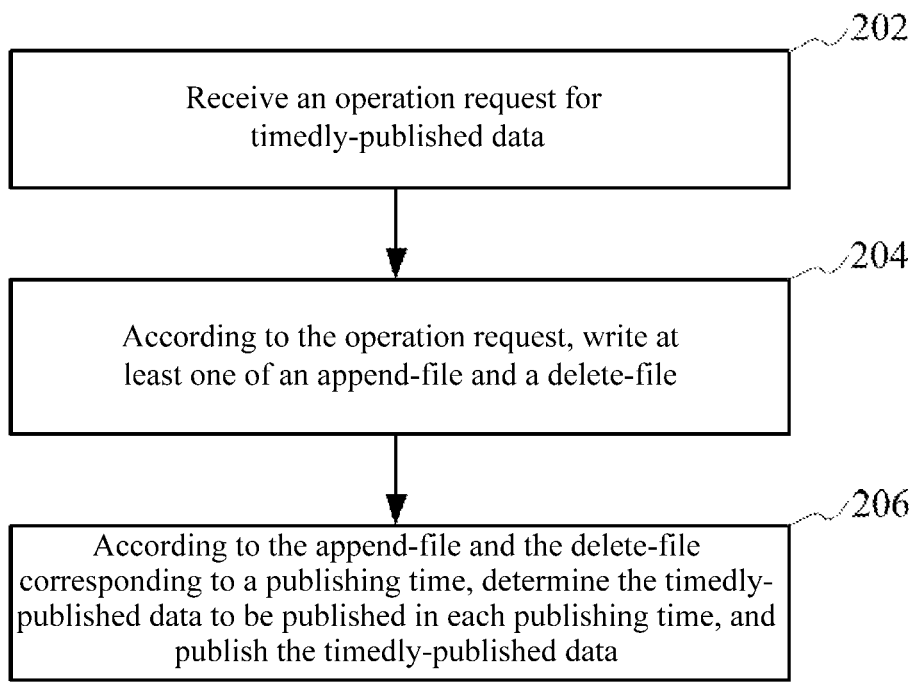
FIG. 2 depicts another exemplary method for processing timedly-published data consistent with various embodiments.

FIG. 2 depicts another exemplary method for processing timedly-published data consistent with various embodiments. The disclosed method can be used in application scenarios to obtain an operation request from a user and to timedly publishing information. For example, the timedly-published data can be used to provide network users with: a game notification, a friend's birthday notification, an information message publication, etc.

In Step 202, an operation request for timedly-published data can be received.

In one embodiment, the operation request can be sent from a client by the large number of users and can then be received. The received operation request can contain a data append request, a data delete request, and a data update request. In one embodiment, the timedly-published data can use "minute" as a unit. The data append request can be configured to append a piece of timedly-published data that users want to timedly publish. The data delete request can be configured to delete a piece of timedly-published data. The data update request can be configured to update a piece of timedly-published data including, e.g., the publishing time and/or the publishing content.

In Step 204, according to the operation request, at least one of an append-file and a delete-file can be written.

According to the received operation request, an operation of writing at least one of an append-file and a delete-file can be processed. The append-file and the delete-file can use the publishing time of the timedly-published data as an index. The append-file can correspond to the to-be-appended timedly-published data or the post-updated timedly-published data. The delete-file can correspond to the to-be-deleted timedly-published data or the pre-updated timedly-published data. The append-file and the delete-file can be distinguished by different suffixes. For example, the append-file can use ".data" as the file suffix, while the delete-file can use ".del" as the file suffix. When the received operation requests have different types, files to be written are also different.

When the received operation request is a data append request, only an append-file needs to be written. For example, when a notification to be published at a time of around 18:12 on Jun. 21, 2013 needs to be newly appended, an append-file with an index catalog of "20130621/1812.data" can be created, and the appended timedly-published data can be recorded into the append-file.

When the received operation request is a data delete request, only a delete-file needs to be written. For example, when a notification published at a time of around 23:12 on Jun. 21, 2013 needs to be deleted, a delete-file with an index catalog of "20130622/2312.del" can be created, and the to-be-deleted timedly-published data or the unique ID corresponding to said timedly-published data can be recorded into the delete-file.

When the received operation request is a data update request, an append-file and a delete-file need to be written to record information of the pre-updated timedly-published data, such as a unique ID, into the delete-file, and to write the post-updated timedly-published data into the append-file. For example, when a user requests to update the timedly-published data with the publishing time of around 22:10 on Jun. 23, 2013 (e.g., to update the content from "Tomorrow is Children's day" to "Tomorrow is Teacher's day" and to update the publishing time to "around 15:20 on Jun. 24, 2013"), a corresponding file-writing operation can be: recording the unique ID of the pre-updated timedly-published data in the delete-file with an index catalog of "20130623/2210.del", and recording the post-updated timedly-published data (e.g., including the post-updated unique ID, the published content, etc.) in the append-file with an index catalog of "20130623/2210.data".

In one embodiment, the index catalog for the append-file and the delete-file can only contain a publishing time of the timedly-published data. In other embodiments, the index key of the append-file and the delete-file can contain the publishing time of the timedly-published data and also contain corresponding information of a user number. For example, when a user client having a user number "10002" sends a data append request to request to append a piece of timedly-published data with the publishing time of around 18:21 on Jun. 22, 2013, the append-file with the index catalog of "10002/20130622/1821.data" can be correspondingly written. When an amount of user number is relatively high, to reduce the amount of writing files and to improve the performance, a remainder result of a modulo operation on the user number by a greater natural number can be used as a top-layer catalog in the index catalog, and the higher natural number can be, e.g., 1000. For example, when the user client having the user number of "1000532" sends a data delete request to delete timedly-published data with a publishing time of around 22:15 on Jun. 23, 2013, correspondingly, a delete-file having an index catalog of "532/20130623/2215.del" needs to be written.

In Step 206, according to the append-file and the delete-file corresponding to the publishing time, the timedly-published data to be published in each publishing time can be determined and the timedly-published data can be published.

In one embodiment, the timedly-published data can use "minute" as a unit. Within each minute, according to the append-file and the delete-file corresponding to a current minute, the timedly-published data to be published in the current one minute is determined. For example, by reading the timedly-published data of the append-file or by only reading unique ID of the timedly-published data, it is determine whether the unique ID of the timedly-published data is in the delete-file. When the unique ID is determined to be in the delete-file, the timedly-published data is determined to be deleted as requested by the user, and there is no need to publish the timedly-published data. When the unique ID is determined not to be in the delete-file, the timedly-published data is determined to be the data to be published in the current time, and such data can then be published.

In various embodiments, the timedly-published data can be published, e.g., to all network users, a specific user, and/or friend(s) of a specific user.

In the disclosed methods and apparatus for processing timedly-published data, after receiving a large number of operation requests from users, using a publishing time of the timedly-published data to be appended, deleted, or updated as an index, writing operations of the append-file or the delete-file can be directly processed. As compared with conventional technologies, there is no need to perform cumbersome operations of inquiring a database and then modifying the database.

When publishing the data in a pre-determined publishing time, use of the disclosed methods of processing timedly-published data can only need to compare the append-file and the delete-file to determine the timedly-published data corresponding to each publishing time, and then publish. The disclosed methods and apparatus can thus reduce time for appending, deleting, and/or updating the timedly-published data, and can improve the processing efficiency. Delayed publishing or timedly-published data loss can be effectively avoided.

Figure 3:
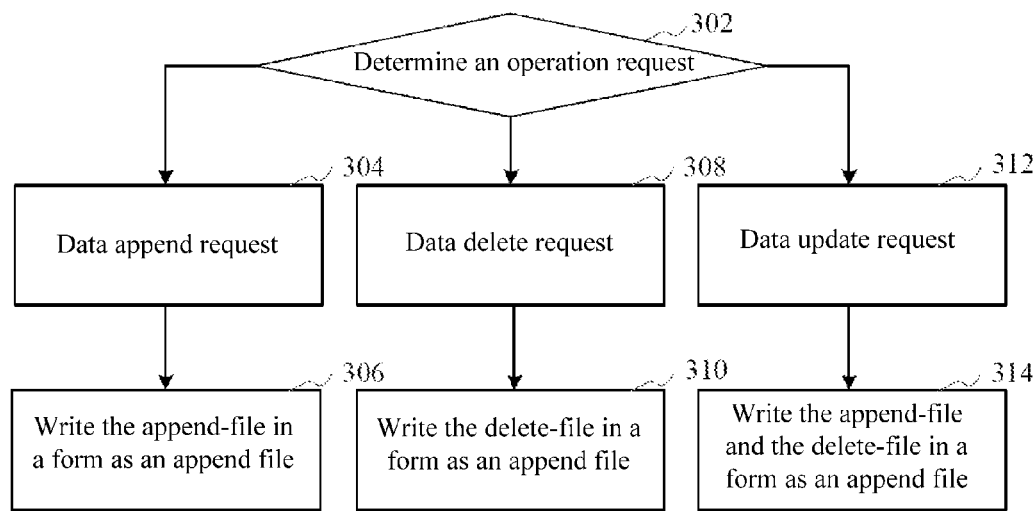
FIG. 3 depicts an exemplary method for appending or deleting files consistent with various embodiments.

FIG. 3 depicts an exemplary method for appending or deleting files consistent with various embodiments. In Step 302, which one from the data append request, the data delete request, and the data update request is the operation request can be determined.

In one embodiment, the type of operation requests can be identified by pre-set communication protocols. For example, for communication data, one or more identification bits (or flags) can be used to identify the type of operation requests. The data append request, the data delete request, and the data update request can refer to description in Step 102. For different operation requests, the contained content can be different. The data append request can contain a unique ID, a publishing time, and publishing content of the to-be-appended timedly-published data. The data delete request can contain the unique ID and the publishing time of the to-be-deleted timedly-published data. The data update request can contain the unique ID, the publishing time, and the publishing content of the pre-updated timedly-published data and the unique ID, the publishing time, and the publishing content of the post-updated timedly-published data.

In Step 304, it is determined that the operation request is the data append request. When the operation request is determined to be the data append request, Step 306 can then be implemented.

In Step 306, the append-file can be written in a form as an append file. In a form as an append file (directly write content to be added at the end of the content of the file), the unique ID and the publishing content of the to-be-appended timedly-published data can be recorded into the append-file corresponding to the publishing time of the to-be-appended timedly-published data.

In Step 308, it is determined that the operation request is the data delete request. When the operation request is determined to be the data delete request, Step 310 can be implemented.

In Step 310, in the form as the append file, the delete-file can be written in the form as the append file. In the form as the append file, the unique ID of the to-be-deleted timedly-published data can be recorded into the delete-file corresponding to the publishing time of the to-be-deleted timedly-published data.

In Step 312, it is determined that the operation request is the data update request. When the operation request is determined to be the data update request, Step 314 can be implemented.

In Step 314, the append-file and the delete-file can be written in the form as the append file. In the form as the append file, the unique ID of the to-be-updated timedly-published data can be recorded into the delete-file corresponding to the publishing time of the to-be-updated timedly-published data, and the unique ID and the publishing content of the post-updated timedly-published data can be recorded into the append-file corresponding to the publishing time of the post-updated timedly-published data.

In one embodiment, the operation to write the append-file or delete-file in the form as the append file can further reduce the processing time. When writing the delete-file, only the unique ID of the to-be-deleted timedly-published data needs to be deleted. Processing efficiency can further be improved. Storage space required by the delete-file can be reduced.

Figure 4:
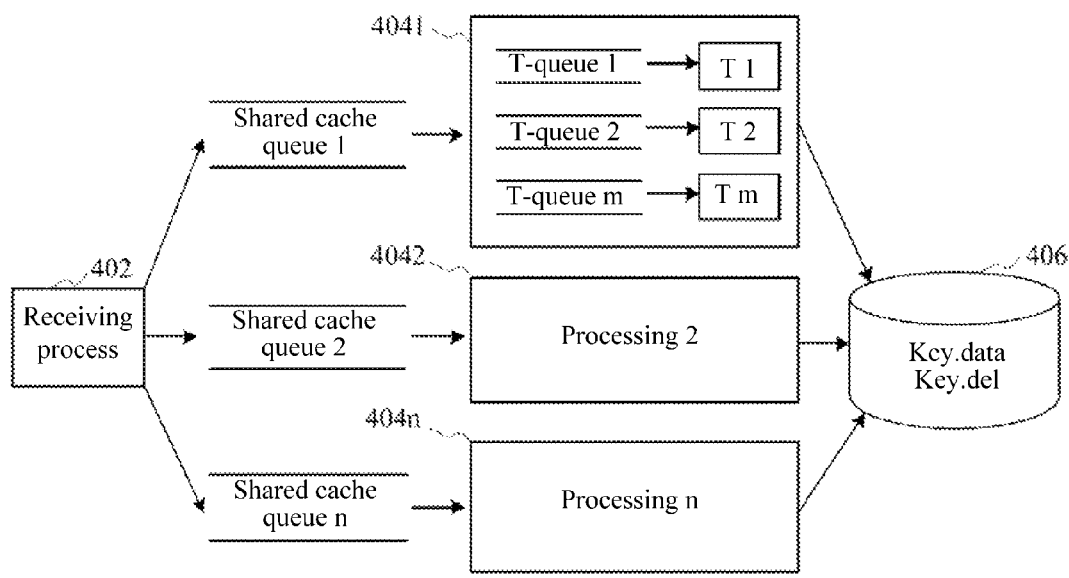
FIG. 4 depicts an exemplary application scenario for processing timedly-published data consistent with various embodiments.

FIG. 4 depicts an exemplary application scenario for processing timedly-published data consistent with various embodiments. In one embodiment, a receiving process 402 can receive operation requests sent from clients by a large number of users. The received operation request can contain a data append request, a data delete request, and a data update request.

According to a user ID, the receiving process 402 can determine a shared cached queue corresponding to the user ID, can receive the operation request(s) via the shared cached queue. The user ID can be, but not limited to, a user number uniquely corresponding to the user. A corresponding, receiving cached queue can be determined by a remainder result of a modulo (mod) operation on the user number by a total number of the shared cached queues. For example, when the user number is 10002, the remainder result from 10002 and the total number of shared cached queues can be 0. By adding one to the remainder result, the shared cached queue 1 can be obtained.

The receiving process 402 can then press the operation request into the shared cached queue 1 for the data of shared cached queue 1 to be processed in a manner of "first-in first-out", or any other suitable manner. A 4041 process 1 of corresponding to the shared cached queue 1 can extract the operation request of the shared cached queue 1 , and according to the user ID, can determine a thread (T) queue corresponding to the user ID, then via the determined thread queue, receive the operation request, and then via a thread corresponding to the thread queue, can process the operation of writing the append-file or delete-file.

In one embodiment, 4041 process 1 can determine a corresponding thread queue according to a remainder result of a modulo operation on the user number by a total number of the thread queues. A thread corresponding to the thread queue can process the operation of writing the append-file or delete-file according to the method depicted in FIG. 3, although other methods can be used without limitation. For example, when the operation request is a data append request, an append-file can be written. When the operation request is a data delete request, the delete-file can be written. When the operation request is a data update request, the append-file and the delete-file can be written simultaneously.

Referring to FIG. 4, the append-file and the delete-file can be stored in a storing module 406. The storing module 406 can be at least one of a hard disk, a magnetic disk, etc. The append-file has a suffix of ".data", while the delete-file has a suffix of ".del".

In one embodiment, the index key of the append-file and the delete-file can contain the publishing time of the timedly-published data and also contain corresponding information of a user number. For example, when a user client having a user number "10002" sends a data append request to request to append a piece of timedly-published data with the publishing time of around 18:21 on Jun. 22, 2013, the append-file with the index catalog of "10002/ 20130622/1821.data" can be written by the thread. When an amount of user number is relatively high, to reduce the amount of writing files and to improve the performance, a remainder result of a modulo operation on the user number by a greater natural number can be used as a top-layer catalog in the index catalog, and the higher natural number can be, e.g., 1000. For example, when the user client having the user number of "1000532" sends a data delete request to delete timedly-published data with a publishing time of around 22:15 on Jun. 23, 2013, correspondingly, a delete-file having an index catalog of "532/20130623/2215.del" can be written by a thread.

In the embodiment, the user operation request can be received via different shared cached queues to reduce conflicts when processing a large number of operation requests. In addition, when writing the append-file or the delete-file, different threads can work on different parts. As the catalog of the append-file and the delete-file contains related information of the user number, the append-file or the delete-file written by different threads cannot be same. This avoids the risk of data conflict when writing files.

Figure 5:
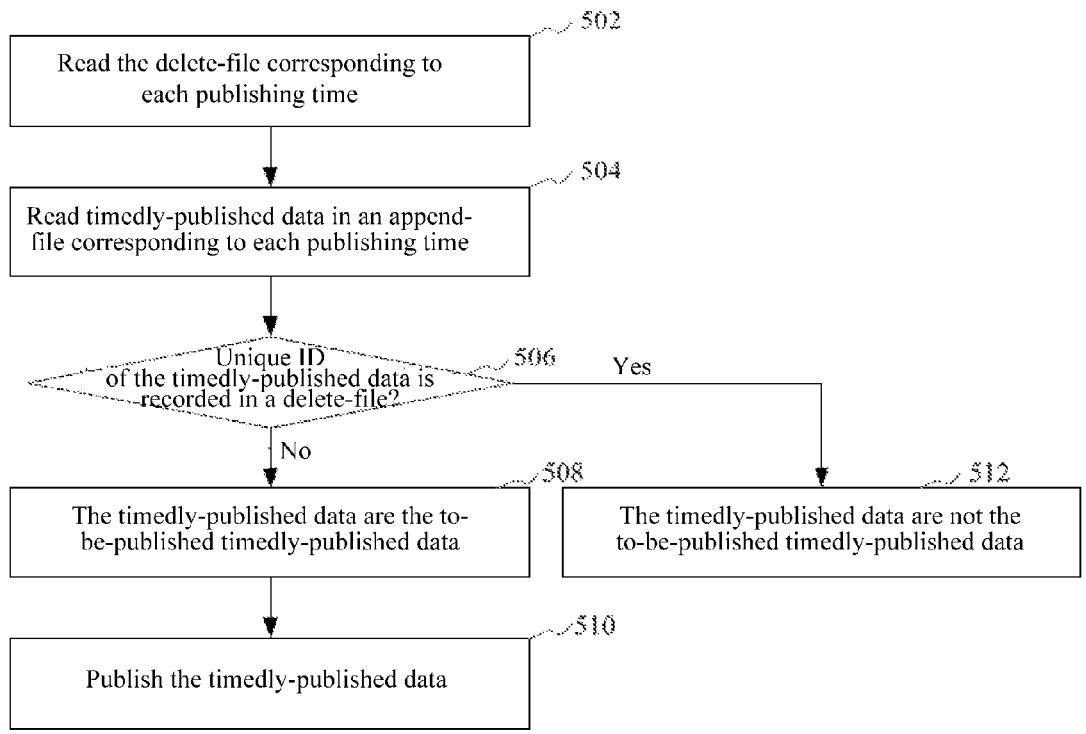
FIG. 5 depicts an exemplary publishing process for processing timedly-published data consistent with various embodiments.

FIG. 5 depicts an exemplary publishing process for processing timedly-published data consistent with various embodiments. The exemplary publishing process for processing timedly-published data can contain all processes as depicted in FIGS. 2-3.

In Step 502, the delete-file corresponding to the each publishing time can be read.

In one embodiment, the publishing time uses "minute" as a unit. In every minute, corresponding delete-file can be read into a memory device. For example, at the time of 23:12 on Jun. 22, 2013, the delete-file having an index catalog of "20130622/2312. del" can be read into the memory device. As shown in FIG. 3, as the delete-file only contains the unique ID of the deleted timedly-published data, the delete-file can be small and the reading speed can be improved. In other embodiments, the index catalog of the read delete-file can contain corresponding information of the user number. The corresponding information can be the remainder result generated from the user number and a large natural number 1000. For example, at the time of 12:19 on Jun. 23, 2013, the delete-files with the index catalog of "0/20130623/ 1219.del", "1/20130623/1219.del" "532/20130623/ 1219.del", etc. can be read.

In Step 504, unique ID of the timedly-published data in the append-file corresponding to the each publishing time can be read.

Referring to FIG. 3, the append-file is processed by a writing operation in a form as an append file. In one embodiment, the timedly-published data in the append-file can be read according to a pre-set order. For example, at the time of 12:19 on Jun. 23, 2013, the unique ID of the timedly-published data in the append-file with the catalog of "20130622/2312.data" can be read into the memory device. In other embodiments, the index catalog of the read append-file can contain the user number or corresponding information of the user number, and the index catalog structure can refer to the index catalog in the read delete-file as described in Step 502.

In Step 506, it is determined whether the unique ID of the timedly-published data can be recorded in the delete-file.

It is compared whether the unique ID of the read timedly-published data is recorded in the delete-file in the memory device. When the unique ID is determined not to be in the delete-file, Step 508 can be implemented. When the unique ID is determined to be in the delete-file, Step 512 can be implemented.

In Step 508, it is determined that the timedly-published data are the to-be-published timedly-published data.

In Step 510, the timedly-published data can be published. When implementing Step 510 after Step 508, the timedly-published data can be published. The timedly-published data can be published, e.g., to all network users, a specific user, and/or friend(s) of a specific user.

In Step 512, it is determined that the timedly-published data are not the to-be-published timedly-published data. When determining that the timedly-published data are not the to-be-published timedly-published data, no publishing can be performed, and a next piece of timedly-published data can be continuously read.

In addition, the publishing time uses "minute" as a unit. In every minute, according to the append-file and the delete-file, the timedly-published data can be published. After this time point (ending of one minute), a time interval can be pre-set. For example, every hour, or every day, deleting operations can be performed to expired append-file and the delete-file and to release storage space of hard disk and/or magnetic disk.

In one embodiment, when publishing the timedly-published data, only the delete-file with having small size needs to be read. The timedly-published data in the append-file can be read in an order without uploading a large number of timedly-published data to the memory device. Time used for memory loading can thus be reduced and processing efficiency can be improved.

Figure 6:
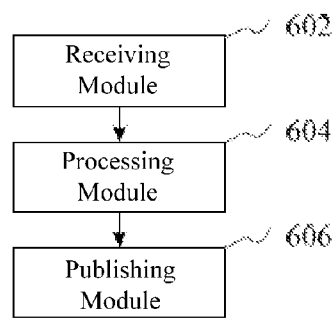
FIG. 6 depicts an exemplary apparatus for processing timedly-published data consistent with various embodiments.

FIG. 6 depicts an exemplary apparatus for processing timedly-published data consistent with various embodiments. The exemplary apparatus can be used, but not limited to, in one server. The server can provide network users with: a game notification, a friend's birthday notification, an information message publication, etc.

The exemplary apparatus for publishing the timedly-published data can include: a receiving module 602, a processing module 604, and/or a publishing module 606.

The receiving module 602 can be configured to receive an operation request for the timedly-published data. The operation request can contain a data append request, a data delete request, and/or a data update request.

The processing module 604 can be configured to write at least one of an append-file and a delete-file according to the operation request. The append-file can correspond to the to-be-appended timedly-published data or post-updated timedly-published data. The delete-file can correspond to to-be-deleted timedly-published data or pre-updated timedly-published data. Each of the append-file and the delete-file can use a publishing time of the timedly-published data as an index.

In one embodiment, the apparatus can include further the publishing module 606 to realize the function of publishing the timedly-published data. The publishing module 606 can be configured to determine the to-be-published timedly-published data in each publishing time, and to publish the timedly-published data, according to the append-file and the delete-file corresponding to each publishing time.

Figure 7:
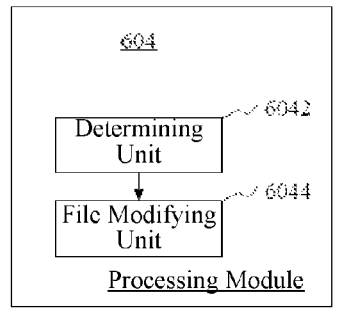
FIG. 7 depicts an exemplary processing module consistent with various embodiments.

Referring to FIG. 7, an exemplary processing module 604 can include a determining unit 6042 and/or a file modifying unit 6044.

The determining unit 6042 can be configured to determine which one from the data append request, the data delete request, and the data update request is the operation request.

The file modifying unit 6044 can be configured: when the operation request is determined to be the data append request, in a form as an append file, to record the unique ID and the publishing content of the to-be-appended timedly-published data into the append-file corresponding to the publishing time of the to-be-appended timedly-published data.

The file modifying unit 6044 can also be configured: when the operation request is determined to be the data delete request, in the form as the append file, to record the unique ID of the to-be-deleted timedly-published data into the delete-file corresponding to the publishing time of the to-be-deleted timedly-published data.

The file modifying unit 6044 can further be configured: when the operation request is determined to be the data update request, in the form as the append file, to record the unique ID of the pre-updated timely-published data into the delete-file corresponding to the publishing time of the pre-updated timely-published data, and to record the unique ID and the publishing content of the post-updated timely-published data into the append-file corresponding to the publishing time of the post-updated timely-published data.

In addition, the receiving module 602 can be configured, according to a user ID to determine a shared cached queue corresponding to the user ID, and to receive the operation request(s) via the shared cached queue. The user ID can be, but not limited to, a user number uniquely corresponding to the user. The receiving module 602 determines a corresponding, receiving shared cached queue according to a remainder result of modulo operation on the user number by a total number of the shared cached queues.

The processing module 604 can be configured, according to the user ID, to determine a thread queue corresponding to the user ID, to receive the operation request via the thread queue, and to write the append-file or the delete-file via a thread corresponding to the thread queue. Correspondingly, the processing module 604 can determine the corresponding processing cached queue according to the remainder result of modulo operation on the user number by a total number of the thread queues.

In one embodiment, the publishing module 606 can be configured to read the delete-file corresponding to the each publishing time; to read the unique ID of the timedly-published data in the append-file corresponding to the each publishing time; and to determine whether the unique ID of the timedly-published data is recorded in the delete-file.

When the unique ID of the timedly-published data is not recorded in the delete-file, the timedly-published data can be the to-be-published timedly-published data. When the unique ID of the timedly-published data is recorded in the delete-file, the timedly-published data are not the to-be-published timedly-published data.

As disclosed herein, the disclosed process can be performed in part or in whole by hardware related to instructions from computer programs. Such programs and/or instructions can be stored in a non-transitory computer readable medium. When the program is being performed, the disclosed method(s) or step(s) in the method(s) can be included. The non-transitory computer readable medium can include one or more of a disk, a CD, a ROM (Read-Only Memory), and/a RAM (Random Access Memory).

For example, a publishing terminal can be provided as disclosed herein. FIG. 8 depicts an exemplary publishing terminal for processing timedly-published data consistent with various embodiments. The publishing terminal can include, but is not limited to, smart phones, tablet computers, e-book readers, moving picture experts group audio layer III (MP3) players, moving picture experts group audio layer IV (MP4) players, laptops, PDA (personal digital assistant), POS (point of sales), car-carrying computer, and/or desktop computers. In one embodiment, the publishing terminal can be any user terminal that has a client installed therein and can be used in the environment of FIG. 9. In one embodiment, the publishing terminal can be a mobile phone.

FIG. 8 depicts at least a portion of an exemplary publishing terminal 800. As shown in FIG. 8, the exemplary terminal 800 can include an RF (Radio Frequency) circuit 810, a storage device 820 including one or more computer-readable storage media, an input unit 830, a display unit 840, a sensor 850, an audio circuit 860, a transmission module 870, a processor 880 including one or more processing cores, a power supply 890, and/or other components. In various embodiments, the terminal(s) described herein can include more or less components as depicted in FIG. 8. Certain components/parts can be omitted, combined, replaced, and/or added.

The RF circuit 810 can be used to send/receive information or send/receive signal during communication. In particular, after receiving downlink information from a base station, such information can be processed by the one or more processors 880. Further, the data related to the uplink can be sent to the base station. Generally, the RF circuit 810 can include, but be not limited to, an antenna, at least one amplifier, a tuner, one or more oscillators, a user identity module (SIM) card, a transceiver, a coupler, LNA (i.e., Low Noise Amplifier), a duplexer, etc. In addition, the RF circuit 810 can communicate with other devices via a wireless communication network. The wireless communication can use any communication standards or protocols, including but not limited to, GSM (Global System for Mobile Communications), GPRS (General Packet Radio Service), CDMA (Code Division Multiple Access), WCDMA (Wideband encode Division Multiple Access), LTE (Long Term Evolution), e-mail, SMS (Short Messaging Service).

The storage device 820 (e.g., a non-transitory computer readable storage medium) can be used for storing software programs and modules, such as those software programs and modules corresponding to the disclosed methods and apparatus. By running software programs and modules stored in the storage device 820, the processor 880 can perform various functional applications and data processing to process timedly-published data. The storage device 820 can include a program storage area and a data storage area. The program storage area can store the operating system, applications (such as sound playback, image playback, etc.) required by at least one function. The data storage area can store data (such as audio data, phone book, etc.) created when using the terminal. In addition, the storage device 820 can include a high-speed random access memory and a non-volatile memory. For example, the storage device 820 can include at least one disk memory, flash memory, and/or other volatile solid-state memory elements. Accordingly, the storage device 820 can further include a memory controller to provide the processor 880 and the input unit 830 with access to the storage device 820.

The input unit 830 can be used to receive inputted numeric or character information, and to generate signal input of keyboard, mouse, joystick, and trackball or optical signal input related to the user settings and function controls. Specifically, the input unit 830 can include a touch control panel 831 and other input device(s) 832. The touch-sensitive surface 831, also known as a touch screen or touch panel, can collect touch operations that a user conducts on or near the touch-sensitive surface 831. For example, a user can use a finger, a stylus, and any other suitable object or attachment on the touch-sensitive surface 831 or on an area near the touch-sensitive surface 831. The touch-sensitive surface 831 can drive a connecting device based on a preset program. Optionally, the touch control panel 831 can include a touch detection device and a touch controller. The touch detection device can detect user's touch position and detect a signal due to a touch operation and send the signal to the touch controller. The touch controller can receive touch information from the touch detection device, convert the touch information into contact coordinates to send to the processor 880, and receive commands sent from the processor 880 to execute. Furthermore, the touch control panel 831 can be realized by resistive, capacitive, infrared surface acoustic wave, and/or other types of surface touch. In addition to the touch control panel 831, the input unit 830 can also include other input device(s) 832. Specifically, the other input device(s) 832 can include, but be not limited to, a physical keyboard, function keys (such as volume control buttons, switch buttons, etc.), a trackball, a mouse, an operating lever, or combinations thereof.

The display unit 840 can be used to display information inputted by the user, information provided to the user, and a variety of graphical user interfaces of the terminal 800. These graphical user interfaces can be formed by images, text, icons, videos, and/or any combinations thereof. The display unit 840 can include a display panel 841 configured by, e.g., LCD (Liquid Crystal Display), OLED (Organic Light-Emitting Diode), etc. Further, the touch control panel 831 can cover the display panel 841. When the touch control panel 831 detects a touch operation on or near the touch sensitive surface, the touch operation can be sent to the processor 880 to determine a type of the touch operation. Accordingly, the processor 880 can provide visual output on the display panel 841. Although in FIG. 8 the touch-sensitive surface 831 and the display panel 841 are shown as two separate components to achieve input and output functions, in some embodiments, the touch control panel 831 and the display panel 841 can be integrated to perform input and output functions.

The terminal 800 in FIG. 8 can further include at least one sensor 850, such as optical sensors, motion sensors, and other suitable sensors. Specifically, the optical sensors can include an ambient optical sensor and a proximity sensor. The ambient optical sensor can adjust brightness of the display panel 841 according to the brightness of ambient light. The proximity sensor can turn off the display panel 841 and/or turn on backlighting, when the terminal 800 moves to an ear. As a type of motion sensor, a gravity sensor can detect amount of an acceleration in each direction (e.g., including three axis) and detect magnitude and direction of gravity when in stationary. The gravity sensor can be used to identify phone posture (for example, switching between horizontal and vertical screens, related games, magnetometer calibration posture, etc.), and/or vibration recognition related functions (e.g., pedometer, percussion, etc.). The terminal 800 can also be configured with, e.g., a gyroscope, a barometer, a hygrometer, a thermometer, an infrared sensor, and/or other sensors.

The audio circuit 860 can include an audio input device 861 such as a microphone and an audio output device 862 such as a speaker and can provide an audio interface between the user and terminal 800. The audio circuit 860 can transmit an electrical signal converted from the received audio data to the speaker 861 to convert into audio signal output. On the other hand, the microphone 862 can convert the collected sound signal to an electrical signal, which can be received by the audio circuit 860 to convert into audio data. The audio data can be output to the processor 880 for processing and then use the RF circuit 810 to transmit to, e.g., another terminal. Alternatively, the audio data can be output to the storage device 820 for further processing. The audio circuit 860 can also include an earplug jack to provide communications between the peripheral headset and the terminal 800.

The terminal 800 can use the transmission module 870 (e.g., a WiFi module) to help users send/receive emails, browse websites, access streaming media, etc. The transmission module 870 can provide users with a wireless or wired broadband Internet access. In various embodiments, the transmission module 870 can be configured within or outside of the terminal 800 as depicted in FIG. 8.

The processor 880 can be a control center of the terminal 800: using a variety of interfaces and circuits to connect various parts, e.g., within a mobile phone; running or executing software programs and/or modules stored in the storage device 820; calling the stored data in the storage device 820; and/or performing various functions and data processing of the terminal 800, e.g., to monitor the overall mobile phone. Optionally, the processor 880 can include one or more processing cores. In an exemplary embodiment, the processor 880 can integrate application processor with modulation and demodulation processor. The application processor is mainly used to process operating system, user interface, and applications. The modulation and demodulation processor is mainly used to deal with wireless communications. In various embodiments, the modulation and demodulation processor may or may not be integrated into the processor 880.

The terminal 800 can further include a power supply 890 (such as a battery) to power various components of the terminal. In an exemplary embodiment, the power supply can be connected to the processor 880 via the power management system, and thus use the power management system to manage charging, discharging, and/or power management functions. The power supply 890 can also include one or more DC or AC power supplies, a recharging system, a power failure detection circuit, a power converter or inverter, a power status indicator, and/or any other suitable components.

Although not shown in FIG. 8, the terminal 800 can further include a camera, a Bluetooth module, etc. without limitations.

The processor(s) 880 of the terminal 800 can upload executable files corresponding to processes of one or more programs to the storage device 820. The processor(s) 880 can then be used to run these one or more programs stored in the storage device 820. For example, the processor(s) 880 can at least be configured to perform following functions.

For example, after receiving an operation request for the timely-published data, at least one of an append-file and a delete-file is written according to the operation request. The append-file corresponds to to-be-appended timely-published data or post-updated timely-published data. The delete-file corresponds to to-be-deleted timely-published data or pre-updated timely-published data. Each of the append-file and the delete-file uses a publishing time of the timely-published data as an index.

The timely-published data includes a unique identification (ID), the publishing time, and publishing content. The operation request includes a data append request, a data delete request, and a data update request. The data append request includes the to-be-appended timely-published data. The data delete request includes the unique ID and the publishing time of the to-be-deleted timedly-published data. The data update request includes the unique ID and the publishing time of the pre-updated timedly-published data and the post-updated timedly-published data.

The processor(s) 880 can be configured to further perform following functions. To write the append-file or the delete-file, it is determined which one from the data append request, the data delete request, and the data update request is the operation request. When the operation request is determined to be the data append request, in a form as an append file, the unique ID and the publishing content of the to-be-appended timedly-published data can be recorded into the append-file corresponding to the publishing time of the to-be-appended timedly-published data. When the operation request is determined to be the data delete request, in the form as the append file, the unique ID of the to-be-deleted timedly-published data can be recorded into the delete-file corresponding to the publishing time of the to-be-deleted timedly-published data. When the operation request is determined to be the data update request, in the form as the append file, the unique ID of the pre-updated timely-published data can be recorded into the delete-file corresponding to the publishing time of the pre-updated timely-published data, and recording the unique ID and the publishing content of the post-updated timely-published data into the append-file corresponding to the publishing time of the post-updated timely-published data.

To receive the operation request for the timedly-published data, according to a user ID, a shared cached queue corresponding to the user ID can be determined. The operation request can be received via the shared cached queue. To write the append-file or the delete-file, a thread queue corresponding to the user ID can be determined according to the user ID. The operation request can be received via the thread queue. The append-file or the delete-file can be written via a thread corresponding to the thread queue.

The user ID can be a user number uniquely corresponding to a user. To determine the shared cached queue corresponding to the user ID, a corresponding shared cached queue can be determined according to a remainder result of a modulo operation on the user number by a total number of the shared cached queues. To determine the thread queue corresponding to the user ID, a corresponding thread queue can be determined according to a remainder result of a modulo operation on the user number by a total number of the thread queues.

According to the append-file and the delete-file corresponding to each publishing time, to-be-published timedly-published data at the each publishing time can be determined and then published.

The processor(s) 880 can be configured to further perform following functions. To determine the to-be-published timedly-published data at the each publishing time, the delete-file corresponding to the each publishing time can be read. The unique ID of the timedly-published data in the append-file corresponding to the each publishing time can be read. It is then determined whether the unique ID of the timedly-published data is recorded in the delete-file. When the unique ID of the timedly-published data is not recorded in the delete-file, the timedly-published data are the to-be-published timedly-published data. When the unique ID of the timedly-published data is recorded in the delete-file, the timedly-published data are not the to-be-published timedly-published data.

In one embodiment, the disclosed methods and apparatus provide advantages in, e.g., storing notifications, rapidly extracting data to be notified, and rapidly sending the notification to the user. Such storing can support high concurrence and high usability. The high concurrence means a large number of requests. The high usability/availability means high degree of integrity of notification data. Rapidly extracting the notification data can satisfy users' requirement.

In a certain embodiment, the notification data (e.g., timedly-published data) can be stored in a form as an append file. When the operation request is a data append request, the append notification can be written into the append-file. When the operation request is a data delete request, the delete notification can be written into the delete-file. When processing an updating operation, the operation is equivalent to a deleting and an appending operation.

When a proxy receives a request from a client, the data can be placed into a shared memory queue (e.g., according to qq % N+1). A worker can take out data from the shared memory queue and place into a thread queue (e.g., according to the qq % m+1), then return the client with a "success".

After the thread in the worker pulls out the data from the thread queue, disk file path can be generated according to a qq-number (e.g., a user number) and a notification-time. Notification data can then be written into the file.

For example, qq-number of 10001 may submit notification data including a notification for appending at around 18:12 on Jun. 21, 2013, including a notification for deleting at around 23:12 on Jun. 9, 2013. Then a record can be appended to the files of /data/10001/20130621/1812.data and /data/10001/20130622/2312.data, respectively.

By routing the notification data to a certain thread for processing according to the qq-number, each thread can be used to do an individual part to respectively operation different files and to reduce risks of writing files in concurrence.

By separately storing the delete-file and the append-file, an appending-operation can always be processed to the files to increases efficiency.

When sending, the delete-file can all be loaded into the memory at certain time-points. As the delete-file often contains field selections with smaller size (e.g., a piece of record may contain qq number plus a unique id), the occupied memory can also be small. Then the data file can be read in order, to determine whether the notification data are deleted. When the data are deleted, any operation can be ignored. When the data are not deleted, the sending operation can be implemented.

The disclosed methods and apparatus can include high concurrence. By using "append" file, the deleting operation can be used to write files with no need to search files. The append file can be operated only about several milliseconds. In addition, when the worker receives the data, the data can be placed into the thread queue, and then be return immediately. The operation of writing a disk can be processed by a thread.

Time for pulling data (notification data) can be reduced and all of the data can be directly loaded according to a notification time.

It should be understood that steps described in various methods of the present disclosure may be carried out in order as shown, or alternately, in a different order. Therefore, the order of the steps illustrated should not be construed as limiting the scope of the present disclosure. In addition, certain steps may be performed simultaneously.

In the present disclosure each embodiment is progressively described, i.e., each embodiment is described and focused on difference between embodiments. Similar and/or the same portions between various embodiments can be referred to with each other. In addition, exemplary apparatus and/or systems are described with respect to corresponding methods.

The disclosed methods, apparatus, and/or systems can be implemented in a suitable computing environment. The disclosure can be described with reference to symbol(s) and step(s) performed by one or more computers, unless otherwise specified. Therefore, steps and/or implementations described herein can be described for one or more times and executed by computer(s). As used herein, the term "executed by computer(s)" includes an execution of a computer processing unit on electronic signals of data in a structured type. Such execution can convert data or maintain the data in a position in a memory system (or storage device) of the computer, which can be reconfigured to alter the execution of the computer as appreciated by those skilled in the art. The data structure maintained by the data includes a physical location in the memory, which has specific properties defined by the data format. However, the embodiments described herein are not limited. The steps and implementations described herein may be performed by hardware.

As used herein, the term "module" or "unit" can be software objects executed on a computing system. A variety of components described herein including elements, modules, units, engines, and services can be executed in the computing system. The methods, apparatus, and/or systems can be implemented in a software manner. Of course, the methods, apparatus, and/or systems can be implemented using hardware. All of which are within the scope of the present disclosure.

A person of ordinary skill in the art can understand that the units/modules included herein are described according to their functional logic, but are not limited to the above descriptions as long as the units/modules can implement corresponding functions. Further, the specific name of each functional module is used to be distinguished from one another without limiting the protection scope of the present disclosure.

In various embodiments, the disclosed units/modules can be configured in one apparatus (e.g., a processing unit) or configured in multiple apparatus as desired. The units/modules disclosed herein can be integrated in one unit/module or in multiple units/modules. Each of the units/modules disclosed herein can be divided into one or more sub-units/modules, which can be recombined in any manner. In addition, the units/modules can be directly or indirectly coupled or otherwise communicated with each other, e.g., by suitable interfaces.

One of ordinary skill in the art would appreciate that suitable software and/or hardware (e.g., a universal hardware platform) may be included and used in the disclosed methods, apparatus, and/or systems. For example, the disclosed embodiments can be implemented by hardware only, which alternatively can be implemented by software products only. The software products can be stored in computer-readable storage medium including, e.g., ROM/RAM, magnetic disk, optical disk, etc. The software products can include suitable commands to enable a terminal device (e.g., including a mobile phone, a personal computer, a server, or a network device, etc.) to implement the disclosed embodiments.

Note that, the term "comprising", "including" or any other variants thereof are intended to cover a non-exclusive inclusion, such that the process, method, article, or apparatus containing a number of elements also include not only those elements, but also other elements that are not expressly listed; or further include inherent elements of the process, method, article or apparatus. Without further restrictions, the statement "includes a" does not exclude other elements included in the process, method, article, or apparatus having those elements.

The embodiments disclosed herein are exemplary only. Other applications, advantages, alternations, modifications, or equivalents to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

Methods and apparatus for processing timedly-published data are provided. After receiving an operation request for the timedly-published data, at least one of an append-file and a delete-file can be written according to the operation request. The append-file corresponds to to-be-appended timedly-published data or post-updated timedly-published data. The delete-file corresponds to to-be-deleted timedly-published data or pre-updated timedly-published data. Each of the append-file and the delete-file uses a publishing time of the timedly-published data as an index.

In the disclosed methods and apparatus for processing timedly-published data, after receiving a large number of operation requests from users, using a publishing time of the timedly-published data to be appended, deleted, or updated as an index, writing operations of the append-file or the delete-file can be directly processed. As compared with conventional technologies, there is no need to perform cumbersome operations of inquiring a database and then modifying the database. The disclosed methods and apparatus can thus reduce time for appending, deleting, and/or updating the timedly-published data, and can improve the processing efficiency.

What is claimed is:

1. A method for processing timedly-published data, comprising:
   receiving an operation request for the timedly-published data, comprising:
      according to a user identification (ID), determining a shared cached queue corresponding to the user ID; and
      receiving the operation request via the shared cached queue; and
   writing at least one of an append-file and a delete-file according to the operation request, comprising:
      according to the user ID, determining a thread queue corresponding to the user ID,
      receiving the operation request via the thread queue, and
      writing the append-file or the delete-file via a thread corresponding to the thread queue,
   wherein the append-file corresponds to to-be-appended timedly-published data or post-updated timedly-published data, and the delete-file corresponds to to-be-deleted timedly-published data or pre-updated timedly-published data,
   wherein each of the append-file and the delete-file includes an index containing a publishing time of the timedly-published data, and after receiving the operation request from users, processing a writing operation of the append-file or the delete-file based on the publishing time of the timedly-published data;

wherein the timedly-published data comprise a unique ID, the publishing time, and publishing content; the operation request comprises a data append request, a data delete request, and a data update request; the data append request comprises the to-be-appended timedly-published data; the data delete request comprises the unique ID and the publishing time of the to-be-deleted timedly-published data; and the data update request comprises the unique ID and the publishing time of the pre-updated timedly-published data and the post-updated timedly-published data; and wherein the user ID is a user number uniquely corresponding to a user; the step of according to the user ID, determining the shared cached queue corresponding to the user ID comprises: according to a remainder result of a modulo operation on the user number by a total number of the shared cached queues determining a corresponding shared cached queue; and the step of according to the user ID, determining the thread queue corresponding to the user ID comprises: according to a remainder result of a modulo operation on the user number by a total number of the thread queues, determining a corresponding thread queue.

2. The method according to claim 1, wherein the step of according to the operation request, writing the append-file or the delete-file comprises:

determining which one from the data append request, the data delete request, and the data update request is the operation request;

when the operation request is determined to be the data append request, in a form as an append file, recording the unique ID and the publishing content of the to-be-appended timedly-published data into the append-file corresponding to the publishing time of the to-be-appended timedly-published data;

when the operation request is determined to be the data delete request, in the form as the append file, recording the unique ID of the to-be-deleted timedly-published data into the delete-file corresponding to the publishing time of the to-be-deleted timedly-published data; and when the operation request is determined to be the data update request, in the form as the append file, recording the unique ID of the pre-updated timely-published data into the delete-file corresponding to the publishing time of the pre-updated timely-published data, and recording the unique ID and the publishing content of the post-updated timely-published data into the append-file corresponding to the publishing time of the post-updated timely-published data.

3. The method according to claim 1, further comprising:

according to the append-file and the delete-file corresponding to each publishing time, determining to-be-published timedly-published data at the each publishing time, and publishing the timedly-published data.

4. The method according to claim 3, wherein the step of according to the append-file and the delete-file corresponding to the each publishing time, determining the to-be-published timedly-published data at the each publishing time comprises:

reading the delete-file corresponding to the each publishing time;

reading the unique ID of the timedly-published data in the append-file corresponding to the each publishing time, and determining whether the unique ID of the timedly-published data is recorded in the delete-file;

wherein:

when the unique ID of the timedly-published data is not recorded in the delete-file, the timedly-published data are the to-be-published timedly-published data; and when the unique ID of the timedly-published data is recorded in the delete-file, the timedly-published data are not the to-be-published timedly-published data.

5. An apparatus for processing timedly-published data, comprising:

a memory;

a processor coupled to the memory;

a plurality of program modules stored in the memory to be executed by the processor, the plurality of program modules comprising:

a receiving module, configured to receive an operation request for the timedly-published data, according to a user ID, to determine a shared cached queue corresponding to the user ID, and to receive the operation request via the shared cached queue; and a processing module, configured to write at least one of an append-file and a delete-file according to the operation request, according to the user ID, to determine a thread queue corresponding to the user ID, to receive the operation request via the thread queue, and to write the append-file or the delete-file via a thread corresponding to the thread queue, wherein the append-file corresponds to to-be-appended timedly-published data or post-updated timedly-published data, and the delete-file corresponds to to-be-deleted timedly-published data or pre-updated timedly-published data, wherein each of the append-file and the delete-file includes an index containing a publishing time of the timedly-published data, and after receiving the operation request from users, a writing operation of the append-file or the delete-file is processed based on the publishing time of the timedly-published data;

wherein the timedly-published data comprise an unique ID, the publishing time, and publishing content; the receiving module is configured to receive the operation request for the timedly-published data from a user, and the operation request comprises a data append request, a data delete request, and a data update request; the data append request comprises the to-be-appended timedly-published data; the data delete request comprises the unique ID and the publishing time of the to-be-deleted timedly-published data; and the data update request comprises the unique ID and the publishing time of the pre-updated timedly-published data and the post-updated timedly-published data; and wherein the user ID is a user number uniquely corresponding to a user; the receiving module is configured, according to a remainder result of a modulo operation on the user number by a total number of the shared cached queues, to determine a corresponding shared cached queue; and the processing module is configured, according to a remainder result of a modulo operation on the user number by a total number of the thread queues, to determine a corresponding thread queue.

6. The apparatus according to claim 5, wherein:

the processing module comprises a determining unit and a file modifying unit;

the determining unit is configured to determine which one from the data append request, the data delete request, and the data update request is the operation request;

the file modifying unit is configured, when the operation request is determined to be the data append request, in a form as an append file, to record the unique ID and the publishing content of the to-be-appended timedly-published data into the append-file corresponding to the publishing time of the to-be-appended timedly-published data;

the file modifying unit is also configured, when the operation request is determined to be the data delete request, in the form as the append file, to record the unique ID of the to-be-deleted timedly-published data into the delete-file corresponding to the publishing time of the to-be-deleted timedly-published data; and the file modifying unit is further configured, when the operation request is determined to be the data update request, in the form as the append file, to record the unique ID of the pre-updated timely-published data into the delete-file corresponding to the publishing time of the pre-updated timely-published data, and to record the unique ID and the publishing content of the post-updated timedly-published data into the append-file corresponding to the publishing time of the post-updated timely-published data.

7. The apparatus according to claim 5, further comprising a publishing module configured, according to the append-file and the delete-file corresponding to each publishing time, to determine to-be-published timedly-published data at the each publishing time, and to publish the timedly-published data.

8. The apparatus according to claim 7, wherein the publishing module is configured to read the delete-file corresponding to the each publishing time, to read the unique ID of the timedly-published data in the append-file corresponding to the each publishing time, and to determine whether the unique ID of the timedly-published data is recorded in the delete-file;

wherein:
when the unique ID of the timedly-published data is not recorded in the delete-file, the timedly-published data are the to-be-published timedly-published data; and
when the unique ID of the timedly-published data is recorded in the delete-file, the timedly-published data are not the to-be-published timedly-published data.

9. A non-transitory computer-readable medium having computer program for, when being executed by a processor, performing a method for processing timedly-published data, the method comprising:

receiving an operation request for the timedly-published data, comprising:
according to a user ID, determining a shared cached queue corresponding to the user ID; and
receiving the operation request via the shared cached queue; and writing at least one of an append-file and a delete-file according to the operation request, comprising:
according to the user ID, determining a thread queue corresponding to the user ID,
receiving the operation request via the thread queue, and
writing the append-file or the delete-file via a thread corresponding to the thread queue, wherein the append-file corresponds to to-be-appended timedly-published data or post-updated timedly-published data, and the delete-file corresponds to to-be-deleted timedly-published data or pre-updated timedly-published data, wherein each of the append-file and the delete-file includes an index containing a publishing time of the timedly-published data, and after receiving the operation request from users, a writing operation of the append-file or the delete-file is processed based on the publishing time of the timedly-published data;

wherein the timedly-published data comprise a unique identification (ID), the publishing time, and publishing content; the operation request comprises a data append request, a data delete request, and a data update request; the data append request comprises the to-be-appended timedly-published data; the data delete request comprises the unique ID and the publishing time of the to-be-deleted timedly-published data; and the data update request comprises the unique ID and the publishing time of the pre-updated timedly-published data and the post-updated timedly-published data; and wherein the user ID is a user number uniquely corresponding to a user; the step of according to the user ID, determining the shared cached queue corresponding to the user ID comprises: according to a remainder result of a modulo operation on the user number by a total number of the shared cached queues determining a corresponding shared cached queue; and the step of according to the user ID, determining the thread queue corresponding to the user ID comprises: according to a remainder result of a modulo operation on the user number by a total number of the thread queues, determining a corresponding thread queue.

10. The non-transitory computer-readable medium according to claim 9, wherein the step of according to the operation request, writing the append-file or the delete-file comprises:

determining which one from the data append request, the data delete request, and the data update request is the operation request;

when the operation request is determined to be the data append request, in a form as an append file, recording the unique ID and the publishing content of the to-be-appended timedly-published data into the append-file corresponding to the publishing time of the to-be-appended timedly-published data;

when the operation request is determined to be the data delete request, in the form as the append file, recording the unique ID of the to-be-deleted timedly-published data into the delete-file corresponding to the publishing time of the to-be-deleted timedly-published data; and when the operation request is determined to be the data update request, in the form as the append file, recording the unique ID of the pre-updated timely-published data into the delete-file corresponding to the publishing time of the pre-updated timely-published data, and recording the unique ID and the publishing content of the post-updated timedly-published data into the append-file corresponding to the publishing time of the post-updated timely-published data.

* * * * *